Mar. 13, 1923.
C. H. MONTAGUE
AUTOMOBILE LIGHT
Filed Jan. 6, 1920
1,448,635
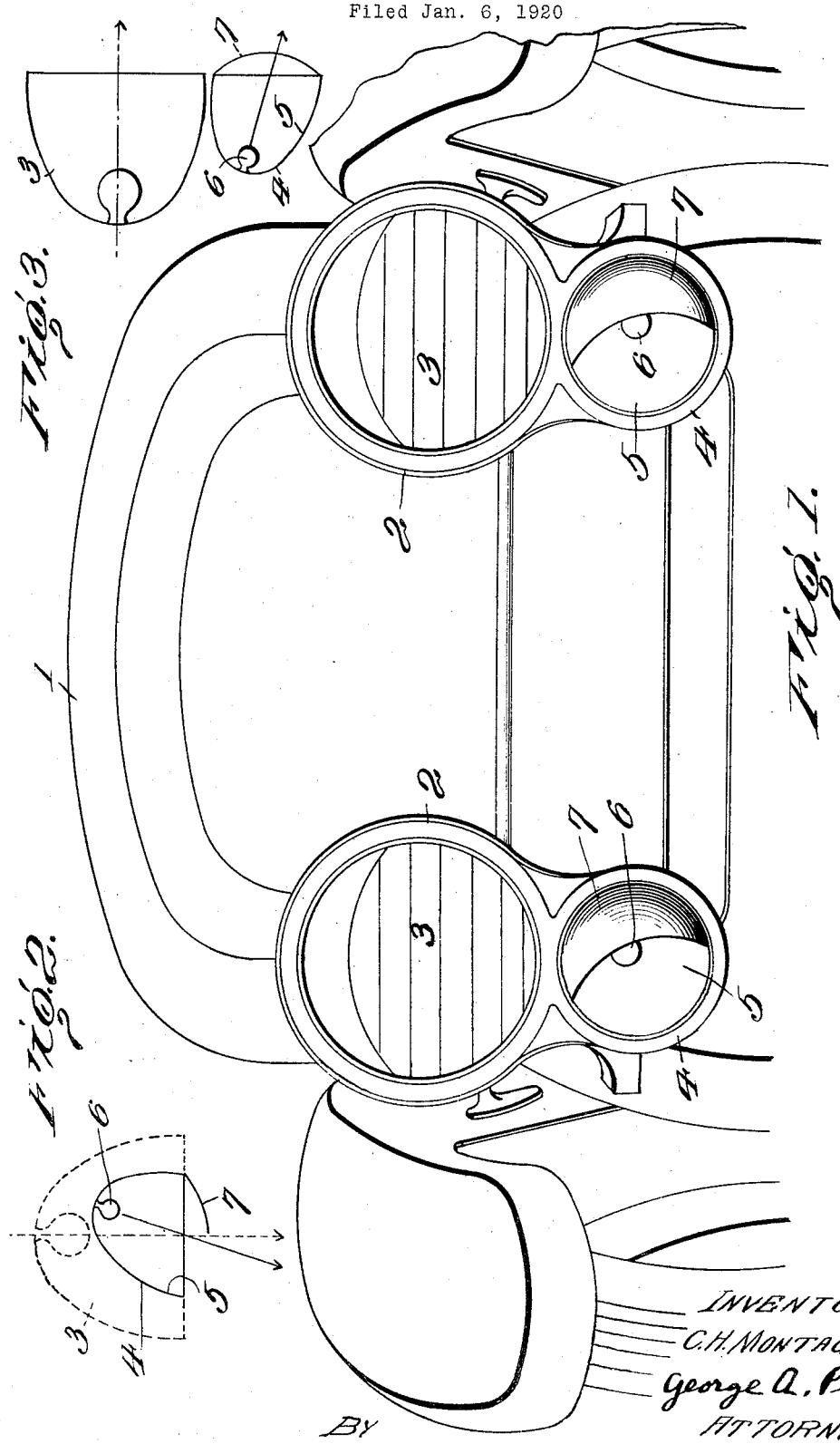
INVENTOR
C.H. MONTAGUE.
BY George A. Prevost
ATTORNEY.

Patented Mar. 13, 1923.

1,448,635

UNITED STATES PATENT OFFICE.

CARROLL H. MONTAGUE, OF RICHMOND, VIRGINIA, ASSIGNOR TO SAF-DE-LITE CORPORATION, A CORPORATION OF VIRGINIA.

AUTOMOBILE LIGHT.

Application filed January 6, 1920. Serial No. 349,728.

*To all whom it may concern:*

Be it known that I, CARROLL H. MONTAGUE, a citizen of the United States, residing at Richmond, in the county of Henrico and State of Virginia, have invented certain new and useful Improvements in Automobile Lights; and I do hereby declare the following to be a full, clear, and exact description of the invention, such as will enable others skilled in the art to which it appertains to make and use the same.

This invention relates to improvements in head lights for motor vehicles and the object of the invention is to provide an illuminating system in which an ordinary head light is combined with a spot light that is located beneath the head light and directs its rays downwardly and to the right. This spot light has a shield on its left side which covers the left hand portion of the lens, so that no direct rays from the spot light will reach the eyes of the operator of an approaching vehicle.

Another object of the invention is to place the ordinary head light and spot light in a single casing, so that supporting parts may be reduced to a minimum and a neat appearance be provided.

With the foregoing objects outlined and with other objects in view which will appear as the description proceeds, the invention consists in the novel features hereinafter described in detail, illustrated in the accompanying drawing and more particularly pointed out in the appended claim.

Referring to the drawing:—

Fig. 1 is a front view of a portion of a motor vehicle showing my improved lamps applied thereto.

Fig. 2 is a horizontal diagrammatic view illustrating the manner in which the spot light directs its beam toward the right.

Fig. 3 is a vertical diagrammatic view showing the manner in which the spot light directs its rays downwardly.

In the drawing 1 represents a motor vehicle to either side of the front of which is attached my improved head lamps 2.

Each of these lamps consists of an ordinary head light 3 and a spot light 4, and the gist of my invention resides in improvements over devices of the prior art, in placing the spot lights below the head lights and arranging parabolic reflectors 5 and bulbs 6 of the spot lights to direct the light rays downwardly and to the right of the path of the vehicle. It will be seen from Figs. 2 and 3 that the axis of the parabolic reflector of each head light is directly horizontal, while the axis of the reflector of the spot light is arranged on an incline, so that the rays directed by the spot light will be thrown downwardly and to the right of the vehicle. This is to prevent rays from the spot light or spot lights reaching the eyes of the driver of an approaching vehicle and each one of the spot lights has a shield 7 arranged to cover the left side of its lens, and these shields will also function to prevent light rays from the spot lights reaching the eyes of the approaching driver or pedestrian.

I am aware that vehicle lamps employing two sources of light and two reflectors have been used heretofore and I also know that spot lights have been used on the side of a vehicle top or wind shield, but I believe that I am the first to arrange the spot light in the manner described and illustrated herein, below the ordinary head light and place its reflector and bulb in such manner as to cause the light rays from the same to be directed downwardly and to the right of the vehicle. If the spot light is arranged to the rear of the vehicle hood, some of its rays will reach said hood and be reflected thereby and this will cause annoyance to the driver of the vehicle having the spot light and also to the driver of an approaching vehicle. Whereas if the spot light is arranged in the manner set forth in this specification, it will illuminate the right hand side of the road only and will eliminate the objectionable glare from the eyes of the approaching driver.

In some localities traffic moves toward the left instead of to the right and in such places my spot lights may be arranged to direct the rays toward the left and the shields will cover the right hand sides of the front of the spot lights instead of the left hand sides.

What I claim and desire to secure by Letters Patent is:—

The combination with a motor vehicle, of a vehicle lamp mounted on the front of the same and including a casing, a light projecting device in said casing and serving as a headlight, a spot light mounted in said casing below the headlight and constructed and arranged to direct its rays forwardly, downwardly and to one side only of the path of movement of the vehicle and a shield over one side portion of the spot light to prevent light rays from the spot light being directed toward the other side of the path of movement of the vehicle.

In testimony whereof I affix by signature.

CARROLL H. MONTAGUE.